United States Patent
Wei et al.

(10) Patent No.: US 11,721,039 B2
(45) Date of Patent: *Aug. 8, 2023

(54) CALIBRATION-FREE INSTANT MOTION TRACKING FOR AUGMENTED REALITY

(71) Applicant: Google LLC, Mountain View, CA (US)

(72) Inventors: Jianing Wei, Cupertino, CA (US); Matthias Grundmann, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/745,125

(22) Filed: May 16, 2022

(65) Prior Publication Data

US 2022/0270290 A1 Aug. 25, 2022

Related U.S. Application Data

(63) Continuation of application No. 16/717,603, filed on Dec. 17, 2019, now Pat. No. 11,341,676.

(60) Provisional application No. 62/801,452, filed on Feb. 5, 2019.

(51) Int. Cl.
| | |
|---|---|
| *G06T 7/73* | (2017.01) |
| *G06T 19/20* | (2011.01) |
| *G06T 19/00* | (2011.01) |
| *G01C 19/00* | (2013.01) |
| *G02B 27/01* | (2006.01) |

(52) U.S. Cl.
CPC ................ *G06T 7/74* (2017.01); *G01C 19/00* (2013.01); *G02B 27/017* (2013.01); *G06T 19/006* (2013.01); *G06T 19/20* (2013.01); *G06T 2219/2004* (2013.01); *G06T 2219/2016* (2013.01)

(58) Field of Classification Search
CPC .......... G06T 7/74; G06T 19/006; G06T 19/20
USPC ....................................... 345/633, 8
See application file for complete search history.

(56) References Cited

U.S. PATENT DOCUMENTS

| | | |
|---|---|---|
| 9,520,002 B1 | 12/2016 | Gavriliuc et al. |
| 10,198,871 B1 | 2/2019 | Hariton |
| 10,403,047 B1 | 9/2019 | Comer et al. |
| 2004/0113935 A1 | 6/2004 | O'Neal et al. |
| 2005/0160368 A1 | 7/2005 | Liu et al. |
| 2010/0203868 A1 | 8/2010 | Sagie |
| 2012/0249741 A1 | 10/2012 | Maciocci et al. |
| 2013/0141461 A1 | 6/2013 | Salter et al. |
| 2013/0286004 A1 | 10/2013 | McCulloch et al. |

(Continued)

*Primary Examiner* — Javid A Amini
(74) *Attorney, Agent, or Firm* — Dority & Manning, P.A.

(57) ABSTRACT

The present disclosure provides systems and methods for calibration-free instant motion tracking useful, for example, for rending virtual content in augmented reality settings. In particular, a computing system can iteratively augment image frames that depict a scene to insert virtual content at an anchor region within the scene, including situations in which the anchor region moves relative to the scene. To do so, the computing system can estimate, for each of a number of sequential image frames: a rotation of an image capture system that captures the image frames; and a translation of the anchor region relative to an image capture system, thereby providing sufficient information to determine where and at what orientation to render the virtual content within the image frame.

20 Claims, 8 Drawing Sheets

(56) References Cited

U.S. PATENT DOCUMENTS

| | | |
|---|---|---|
| 2013/0290421 A1 | 10/2013 | Benson et al. |
| 2014/0089850 A1 | 3/2014 | Gorstan et al. |
| 2014/0287806 A1 | 9/2014 | Balachandreswaran |
| 2015/0023602 A1 | 1/2015 | Wnuk et al. |
| 2015/0046822 A1 | 2/2015 | Kitch et al. |
| 2015/0127486 A1 | 5/2015 | Advani |
| 2017/0345167 A1 | 11/2017 | Ard et al. |
| 2018/0321776 A1 | 11/2018 | Averyanov et al. |
| 2019/0114802 A1 | 4/2019 | Lazarow |
| 2019/0197785 A1* | 6/2019 | Tate-Gans ............. G06T 19/006 |
| 2019/0251720 A1 | 8/2019 | Hariton |
| 2019/0272674 A1 | 9/2019 | Comer et al. |
| 2020/0368616 A1* | 11/2020 | Delamont ............... G06F 3/011 |

* cited by examiner

CALIBRATION-FREE INSTANT MOTION TRACKING FOR AUGMENTED REALITY

PRIORITY CLAIM

Cross-Reference to Related Applications

The present application is a continuation application of, and claims priority to, U.S. Non-Provisional application Ser. No. 16/717,603 having a filing date of Dec. 17, 2019, which is based on and claims priority to U.S. Provisional Application 62/801,452 having a filing date of Feb. 5, 2019, which are incorporated by reference herein in its entirety.

FIELD

The present disclosure relates generally to motion tracking. More particularly, the present disclosure relates to systems and methods for calibration-free instant motion tracking useful, for example, for rending virtual content in augmented reality settings.

BACKGROUND

Augmented reality can refer to systems and/or techniques in which imagery that depicts a real-world scene is "augmented" through the addition of virtual content to the scene. For example, an image that depicts a garden can be augmented by adding a virtual flower into the scene, such that when the resulting augmented image is viewed (e.g., on a display), it appears that the flower is growing in the garden.

Certain more powerful augmented reality systems can also anchor virtual content at a particular location of a real-world scene and can generate augmented imagery that depicts the virtual content as remaining at that particular location, even while the perspective and/or location of the underlying real-world imagery changes. To continue the example given above, for a video that depicts the garden from different angles/locations (e.g., a video captured by a user while walking around the garden), the virtual flower can be anchored to a certain location within the garden such that, even as the perspective of the garden changes over the course of the video, the virtual flower is depicted at the same location within the garden.

However, in order to perform these anchoring techniques, certain existing augmented reality systems require calibration of various device components, which may need to be performed on a per-device or per-model basis. For example, calibration of a virtual reality system can include measuring a correlation between motion sensors and a camera, as regards, for example, timestamp, geometric placement of camera relative to the motion sensors, and/or other characteristics. Calibration of this type can require a custom lab setup, robotic equipment to move devices, and/or specialized calibration software. As such, calibration can be time consuming, represent a source of error, and/or require the expenditure of computing resources (e.g., processing power) during the calibration period, and is therefore generally undesirable. While some more sophisticated techniques can perform on-the-fly calibration, these are typically performed to update parameters that were previously generated through performance of an initial, more rigorous calibration process.

In addition, certain existing augmented reality systems may perform placement of virtual content within a scene based on a three-dimensional mapping of features of the scene. In particular, many of these systems require the introduction of parallax (e.g., via camera movement) in order to generate such a three-dimensional mapping. This need to observe parallax prior to insertion of the virtual content means that virtual content cannot be instantly inserted into imagery.

Thus, there can be an undesirable delay period between when the camera begins capturing imagery for display to the viewer and when the virtual content is inserted. For many augmented reality applications—which use virtual content to convince the viewer that they have entered or are participating in an alternative reality—this delay can undermine the credibility of the alternative reality and can be significantly detrimental to the overall experience.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to generate augmented reality imagery. The method can include obtaining, by one or more computing devices, an initial image frame captured by an image capture system, wherein the initial image frame depicts a scene. The method can include receiving, by the one or more computing devices, user input data descriptive of a user input that requests placement of virtual content at an anchor region within the scene. The method can include generating, by the one or more computing devices, an augmented version of the initial image frame that depicts the virtual content at the anchor region within the scene, wherein the virtual content has an initial orientation. The method can include, for each of one or more subsequent image frames captured by the image capture system: estimating, by the one or more computing devices, a translation of the anchor region relative to the image capture system based at least in part on a comparison of the subsequent image frame to one or more previous image frames; determining, by the one or more computing devices, a rotation of the image capture system based at least in part on sensor data descriptive of rotational motion experienced by the image capture system; determining, by the one or more computing devices, an updated location and an updated orientation of the virtual content for the subsequent image frame based at least in part on the translation of the anchor region relative to the image capture system and based at least in part on the rotation of the image capture system; and generating, by the one or more computing devices, an augmented version of the subsequent image frame that depicts the virtual content at the updated location and having the updated orientation.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1A:
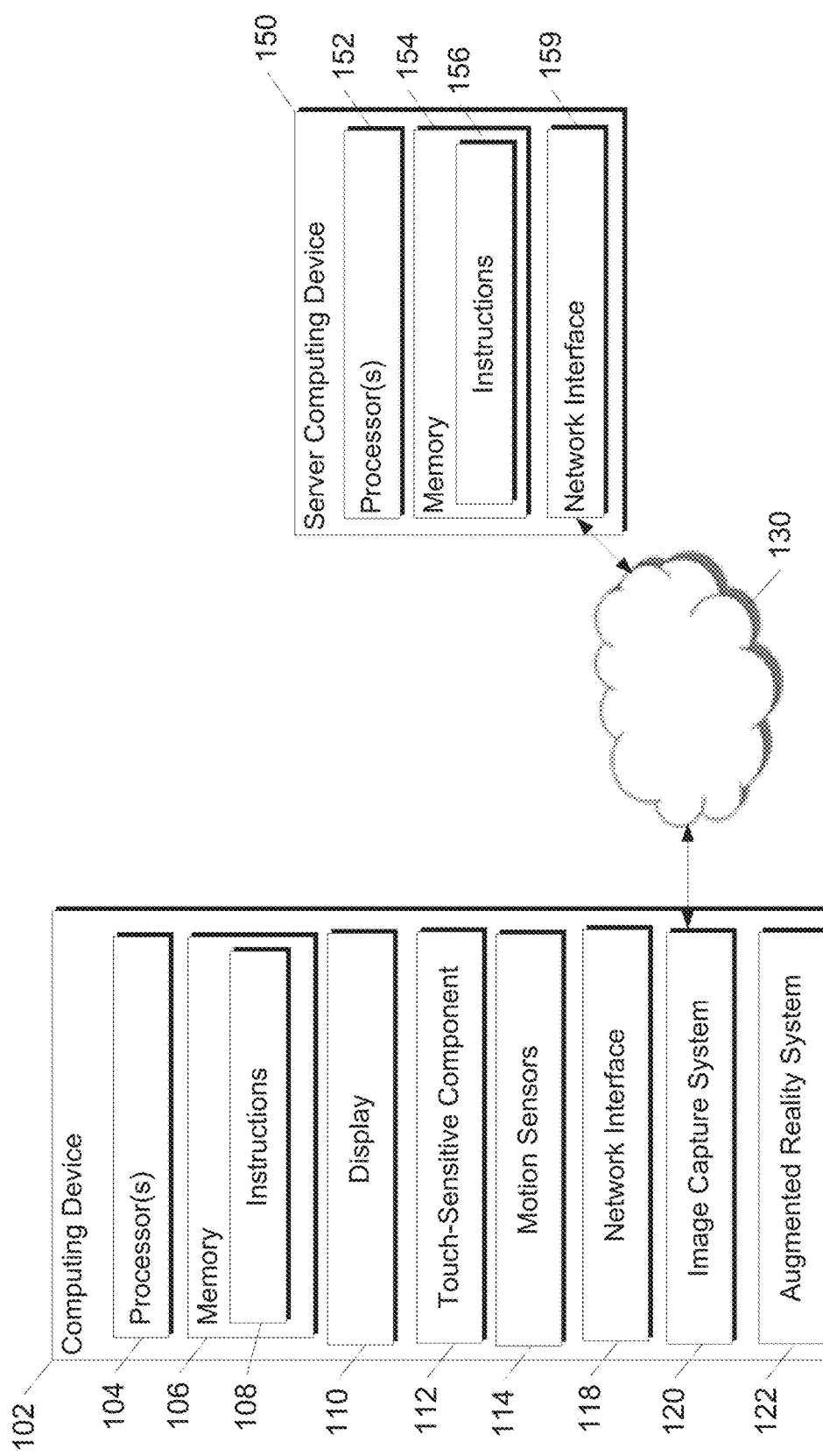
FIG. 1A depicts a block diagram of an example computing system according to example embodiments of the present disclosure.

Generally, the present disclosure is directed to systems and methods for calibration-free instant motion tracking useful, for example, for rending virtual content in augmented reality settings. In particular, a computing system can iteratively augment image frames that depict a scene by rendering virtual content at an anchor region within the scene, including situations in which the anchor region moves relative to the scene. To do so, the computing system can estimate, for each of a number of sequential image frames: a rotation of an image capture system that captures the image frames; and a translation of the anchor region relative to an image capture system, thereby providing sufficient information to determine where and at what orientation to render the virtual content within the image frame.

According to an aspect of the present disclosure, in contrast to many existing systems which jointly estimate the translation and rotation of the image capture system as a single problem, systems and methods of the present disclosure can instead de-couple the operations of estimating the translation and rotation, treating them as independent optimization problems that are separately solved (e.g., based on different, non-overlapping data modalities). In particular, in some implementations, the translation component can be estimated through analysis of the imagery alone (e.g., without regard to sensor data collected from other sensors and/or the rotational computations). Similarly, the rotation component can be determined through analysis of motion sensor data alone (e.g., without regard to the image content and/or the translation computations).

By decoupling the operations of estimating the translation and the rotation in such fashion, there is no need to perform any calibration between the image capture system and the other sensors (e.g., motion sensors such as a gyroscope). Thus, aspects of the present disclosure can be referred to as "calibration-free" motion tracking because a calibration step does not need to be performed, thereby saving time, reducing introduction of errors, and conserving computing resources such as processing time, memory usage, energy expenditure, etc. Likewise, virtual content can be inserted instantaneously without the need to wait for parallax to be observed. Furthermore, because there is no need for collaboration between various different sensors, the systems described herein can be applied to and/or run upon imagery captured by any device that includes sufficient sensors to measure rotational motion of the device.

One application of the calibration-free techniques described herein is placement of virtual content within imagery that depicts the real physical world. In one example use case, a user can interact with a viewfinder portion of a user interface for an image capture system (e.g., the user interface of a camera application on a smartphone) to insert virtual content into the displayed imagery (e.g., a live image frame that depicts a current view of the camera). For example, the user can simply touch the viewfinder to place fun, three-dimensional virtual objects on static or moving surfaces (e.g. horizontal surfaces such as tables, floors, sidewalks, hands, etc.), allowing the user to seamlessly interact with a dynamic real-world environment.

Thus, the user can insert virtual objects or other virtual content into the depicted scene by selecting a particular anchor region at which the virtual content should be located. In response, an augmented reality system of the user's device (e.g., smartphone, dedicated augmented reality device, etc.) can augment the depicted image to include the virtual content at the anchor region. To provide an example, when a user touches the viewfinder, the augmented reality system can "stick" a three-dimensional virtual object to the touched location within the depicted scene, making it look as if the virtual object is part of the real-world scene.

As additional image frames are collected (e.g., as the user moves the device and the camera captures the scene from different perspectives), the augmented reality system can perform the instant motion tracking techniques described herein to continuously augment the new image frames to depict the virtual content at the anchor region.

Figure 3:
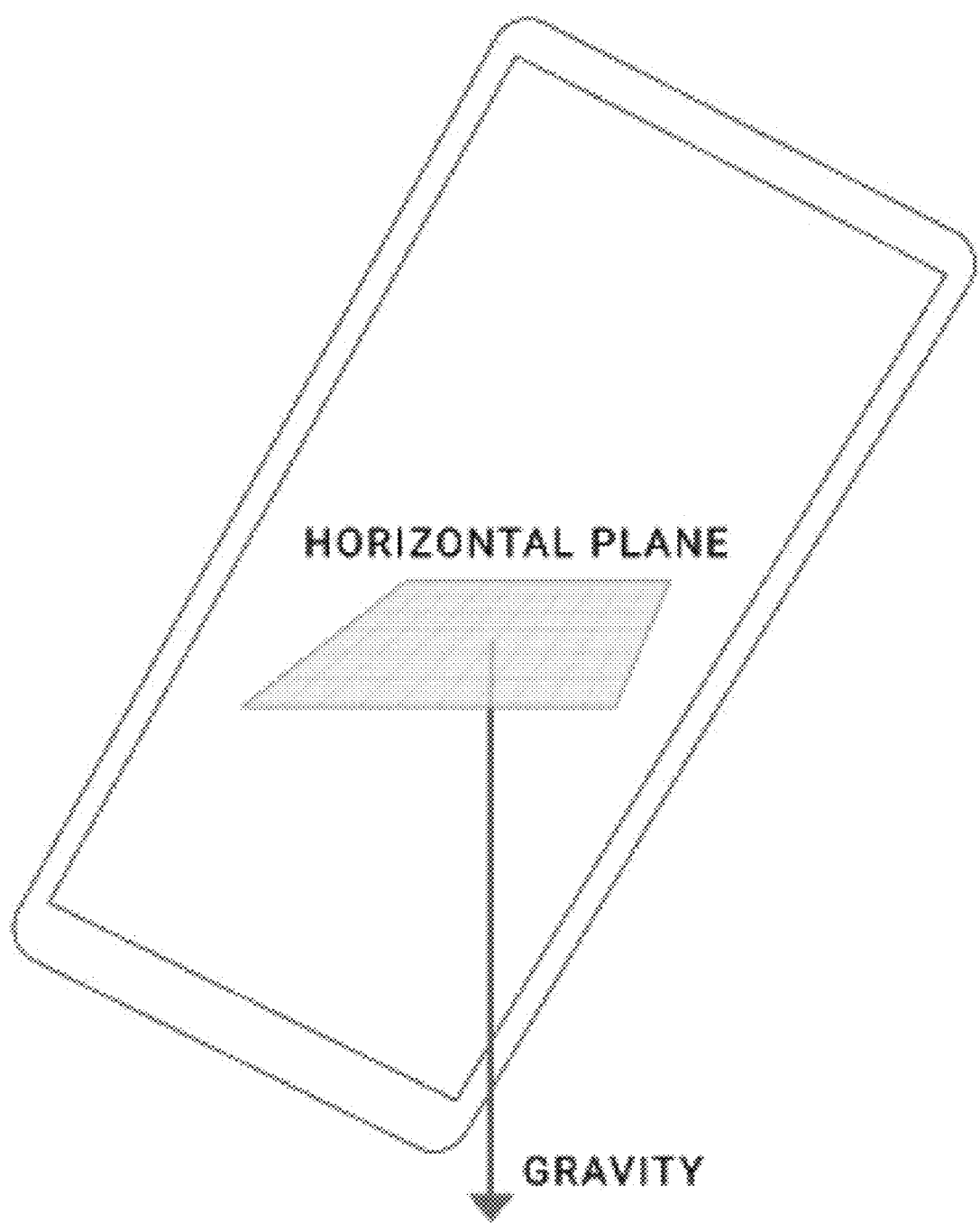
FIG. 3 depicts a graphical diagram of a technique to assess a direction of gravity according to example embodiments of the present disclosure.

In some implementations, the augmented reality system can use the device's sensors (e.g., accelerometer) to provide the initial orientation of the device with respect to the ground plane, thereby understanding the direction of the ground plane relative to the captured imagery. The augmented reality system can assume that the tracked surface is parallel to the ground plane, as identified using the device's sensors. In particular, in some implementations, when the device is approximately steady, an accelerometer sensor or the like can provide the acceleration due to the Earth's gravity. For horizontal planes the gravity vector is parallel to normal of the tracked plane and can accurately provide the initial orientation of phone. For example, FIG. 3 depicts a graphical diagram of a technique to assess a direction of gravity according to example embodiments of the present disclosure. Obtaining the initial orientation of the device in this manner can enable the augmented reality system to track the six degrees of freedom of the camera (e.g., three for translation and three for rotation). This can assist the augmented reality system in accurately transforming and rendering the virtual object within the scene.

Figure 4:
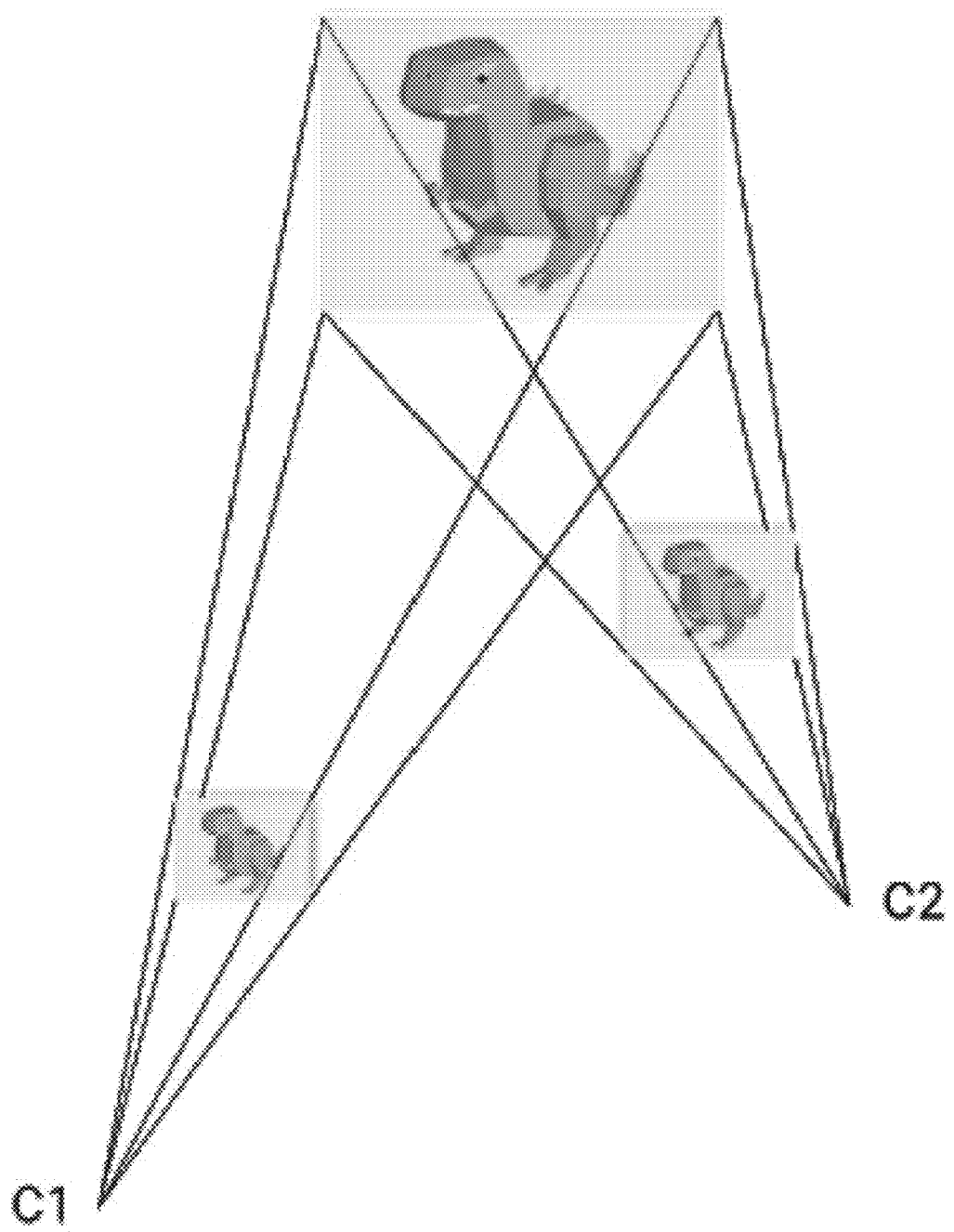
FIG. 4 depicts a graphical diagram of a pinhole camera model according to example embodiments of the present disclosure.

More generally, one core idea behind the instant motion tracking techniques described herein is to decouple the system's translation and rotation estimation, treating them instead as independent optimization problems. In some implementations, the augmented reality system can first determine the three-dimensional camera translation solely from the visual signals included in the image frames themselves. To do this, for example, the augmented reality system can observe the anchor region's apparent two-dimensional translation and relative scale across frames (e.g., the two-dimensional translation and relative scale change estimated from motion of feature points extracted from within a bounding shape defined around the anchor region). A pinhole camera model can relate the two-dimensional translation and scale in the image plane with a final three-dimensional translation of the camera. For example, FIG. 4 depicts a graphical diagram of a pinhole camera model according to example embodiments of the present disclosure. This has the advantage of removing the calibration requirement, since the goal of calibration is to correlate the image data with the motion sensor data such as IMU data.

In some implementations, the augmented reality system can first create motion metadata for the image frames by leveraging machine learning to classify foreground/background features as well as to model temporally coherent camera motion. Alternatively or additionally, machine learning can be used to generate metadata that identifies specific objects within the imagery. The augmented reality system can then take this metadata and use it as input to an algorithm that can track individual objects while discriminating it from others. The algorithm can model each object's state that includes its motion in space, an implicit appearance model (e.g., described as a set of its moving parts), and/or its centroid and extent. Thus, if the anchor region corresponds to a particular object, the augmented reality can estimate translation of the anchor region based on such object state information. The augmented reality system can also perform scale estimation as well as region tracking outside the field of view of the camera. The estimation of scale is important in that when the camera gets closer to the anchor region, the virtual content scales accurately, which is consistent with the perception of real-world objects.

Thus, in some implementations, to estimate translation, the augmented reality system can develop a visual tracker that tracks the two-dimensional location and scale change of an anchor region (e.g., in the form of a bounding shape and/or features contained within such a bounding shape). Then, the augmented reality system can make the assumption that the surface where the virtual content is placed is parallel to the ground plane and can use the device's accelerometer or other sensors to get the surface's orientation relative to the device. Combining two-dimensional location, scale change, and surface orientation, the augmented reality system can obtain the three-dimensional translation using a pinhole camera model.

Separately from determining the translation, the augmented reality system can also obtain the device's three-dimensional rotation (e.g., roll, pitch and yaw) using the device's built-in sensors such as a gyroscope. The gyroscope or similar sensor arrangements can provide the augmented reality system with rotation speed, and then the augmented reality system can accumulate them in quaternion space to obtain rotation.

The estimated three-dimensional translation of the image capture system combined with the three-dimensional rotation of the image capture system provides the augmented reality system with the ability to render the virtual content correctly in the viewfinder. In particular, the augmented reality system can compute the model matrix as the product of rotation matrix and translation matrix. This model matrix enables the system to render the virtual content correctly in the viewfinder. Because the augmented reality system can treat rotation and translation separately, the instant motion tracking approach described herein is calibration free and works on any device with a gyroscope or other sensor arrangement capable of measuring rotational motion.

Furthermore, in some implementations, the augmented reality system can also keep track of global motion even when the camera pans and the anchor region falls outside the field of view. This will help regain the location of the anchor region once the camera pans back and the region re-appears inside the field of view. When the user pans outside the field of view of the anchor region and back, the virtual object will reappear in approximately the same location.

Thus, aspects of the present disclosure solve the problem of instantly placing a virtual object in an augmented reality environment and tracking it over time, without the need for calibration of the augmented reality device. The instant placement and tracking capability creates more engaging augmented reality experience for users. The calibration-free capability allows deployment of augmented reality applications on a much wider set of devices.

The user can interact with the user interface to store the currently displayed augmented imagery as a still image or can record a video of the augmented imagery. In some implementations, the augmented imagery can be exported/stored as an animated image file (e.g., GIF, motion still, or the like). Thus, in some implementations, the augmentation techniques described herein can be performed in real-time concurrent with capture of images by the image capture system. Alternatively or additionally, the augmentation techniques can be performed on a video file that has been previously captured and stored without augmentation (e.g., the augmentation can be performed as a post-processing technique).

With reference now to the Figures, example embodiments of the present disclosure will be discussed in further detail.

Example Devices and Systems

FIG. 1A depicts a block diagram an example computing system according to example embodiments of the present disclosure. The system includes a computing device 102 and a server computing device 150 that is communicatively coupled to the computing device 102 over a network 130.

The computing device 102 can be any form of device, such as mobile computing device (e.g., a smartphone, tablet, computing device that is able to be worn (e.g., computing device embedded in a pair of eyeglasses, a wristband, a necklace, head-mounted device, etc.), handheld computing device, etc.), computing device embedded in a vehicle, home appliance, or other system, smart speaker, laptop, desktop, gaming console, etc.

The computing device 102 includes one or more processors 104 and a memory 106. The one or more processors 104 can be any form of processing device, including, for example, a processing unit, a microprocessor, a controller, a microcontroller, an application specific integrated circuit, graphics processing unit, etc. The memory 106 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 106 can store one or more sets of instructions 108 that, when executed by the computing device 102, cause the computing device 102 to perform operations consistent with the present disclosure.

The computing device 102 can further include a network interface 118 and a display 110. The network interface 118 can enable communications over the network 130. The network interface 118 can include any number of components to provide networked communications (e.g., transceivers, antennas, controllers, cards, etc.).

The display 110 can include different types of display components, such as, for example, a light-emitting diode display (e.g., organic light-emitting diode display), a liquid-crystal display (e.g., thin-film-transistor liquid-crystal display), a thin-film diode display, etc. In some examples, the display 110 can be a head mounted display. In some implementations, the display 110 can also be touch-sensitive. For example, the display 110 can be a capacitive touchscreen, a resistive touchscreen, or other touch-sensitive technologies. Thus, in some implementations, the display 110 can serve as or be the touch-sensitive component 112. In other implementations, the computing device 102 can have an additional or alternative touch-sensitive component 112 that is separate and distinct from the display 110. For example, the touch-sensitive component 112 can be a touch pad or the like.

In some implementations, the computing device 102 can also include one or more motion sensors 114 such as, for example, a gyroscope and an accelerometer. The motion sensor(s) 114 can provide data that indicates the orientation of the device 102 relative to the direction of gravity (e.g., towards the ground) or other data indicative of rotational motion of the device 102. The motion sensor(s) 114 can include one or more moving (e.g., spinning) components or can include only static components. As one example, a gyroscope can include an arrangement of accelerometers (e.g., three or more accelerometers arranged to detect acceleration in three dimensions), IMUs, or the like.

In some implementations, the computing device 102 can include an image capture system 120. The image capture system 120 can include one or more cameras. For example, the cameras can include front-facing cameras, rear-facing cameras, periscopic cameras, and/or configurations. The cameras can include visible spectrum cameras, infrared cameras, or other forms of devices that capture imagery. A camera can include an image sensor, such as, for example a CMOS sensor. The image processing system 120 can further include an image signal processor, a compressor, and/or other components to capture, store, and process image data captured by the image sensor(s). The computing device 102 can perform various image processing and/or computer vision techniques to understand or process the content of the captured imagery.

Figure 1B:
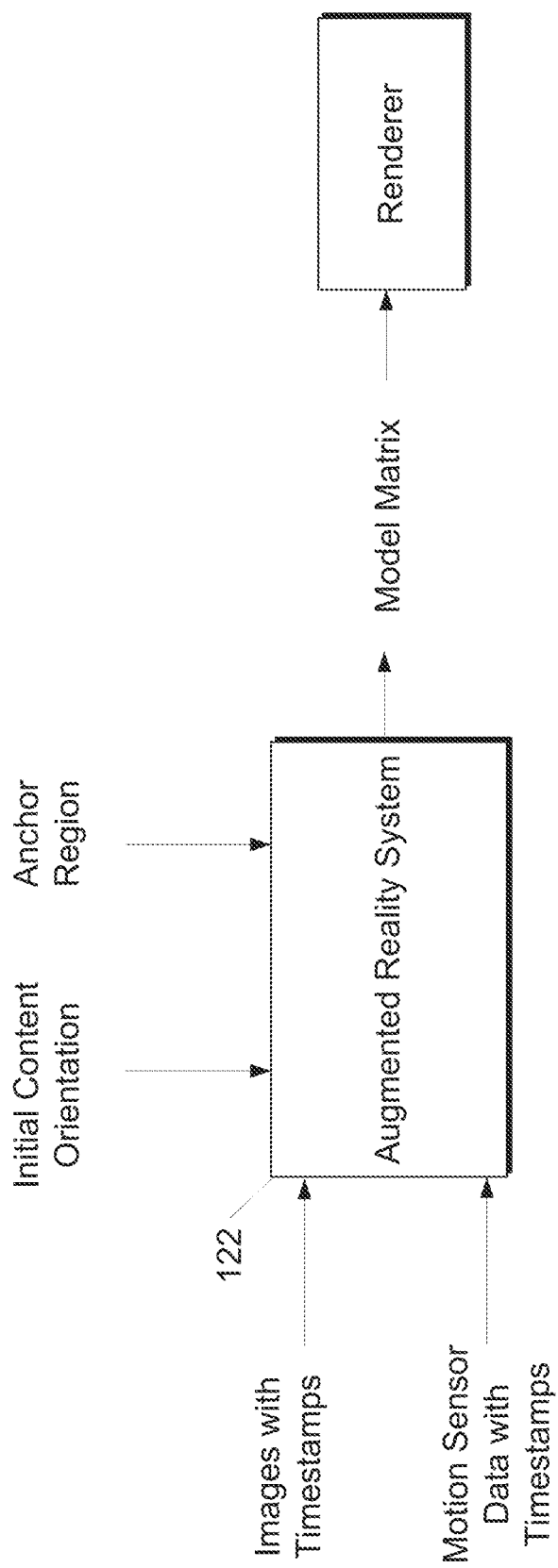
FIG. 1B depicts a block diagram of an example data flow to render a virtual object according to example embodiments of the present disclosure.
Figure 1C:
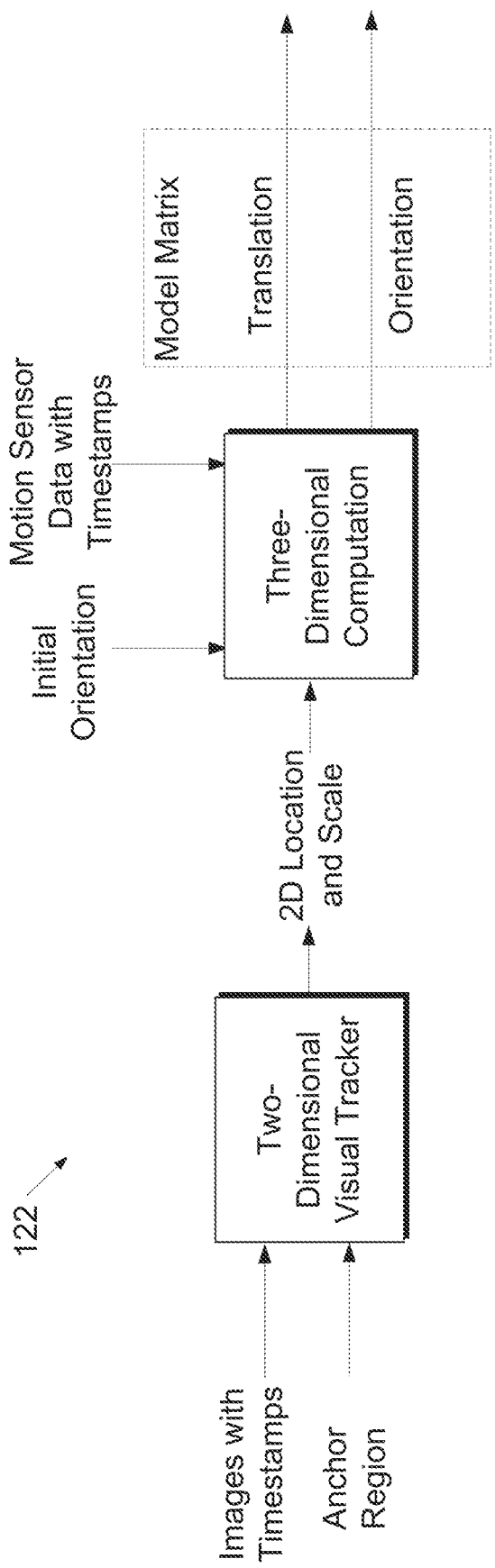
FIG. 1C depicts a block diagram of an example data flow in an augmented reality system according to example embodiments of the present disclosure.

The computing device 102 can include an augmented reality system 122. The augmented reality system 122 can perform any of the augmentation techniques described herein, including, for example, method 200 of FIG. 2. Example augmented reality systems 122 are shown in FIGS. 1B and 1C.

The augmented reality system 122 can include computer logic utilized to provide desired functionality. The augmented reality system 122 can be implemented in hardware, firmware, and/or software controlling a general purpose processor. For example, in some implementations, the augmented reality system 122 includes program files stored on a storage device, loaded into a memory and executed by one or more processors. In other implementations, the augmented reality system 122 includes one or more sets of computer-executable instructions that are stored in a tangible computer-readable storage medium such as RAM hard disk or optical or magnetic media.

In some implementations, the computing device 102 can communicatively connect to a server computing device 150 over the network 130. The server computing device 150 can include one or more processors 152 and a memory 154. The one or more processors 152 can be any form of processing device, including, for example, a processing unit, a microprocessor, a controller, a microcontroller, an application specific integrated circuit, graphics processing unit, etc. The memory 154 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 154 can store one or more sets of instructions 156 that, when executed by the server computing device 150, cause the server computing device 150 to perform operations consistent with the present disclosure.

The server computing device 150 can further include a network interface 159. The network interface 159 can enable communications over the network 130. The network interface 159 can include any number of components to provide networked communications (e.g., transceivers, antennas, controllers, cards, etc.).

The network 130 can be any type of communications network, such as a local area network (e.g., intranet), wide area network (e.g., Internet), or some combination thereof and can include any number of wired or wireless links. In general, communication between the server computing device 150 and the computing device 102 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Server computing device 150 can communicate with the computing device 102 over network 130 by sending and receiving data.

Further, any of the processes, operations, programs, applications, or instructions described as being stored at or performed by the server computing device 150 can instead be stored at or performed by the computing device 102 in whole or in part, and vice versa.

FIG. 1B depicts a block diagram of an example data flow to render a virtual object according to example embodiments of the present disclosure. FIG. 1C depicts a block diagram of an example data flow in an augmented reality system 122 according to example embodiments of the present disclosure.

Example Methods

Figure 2:
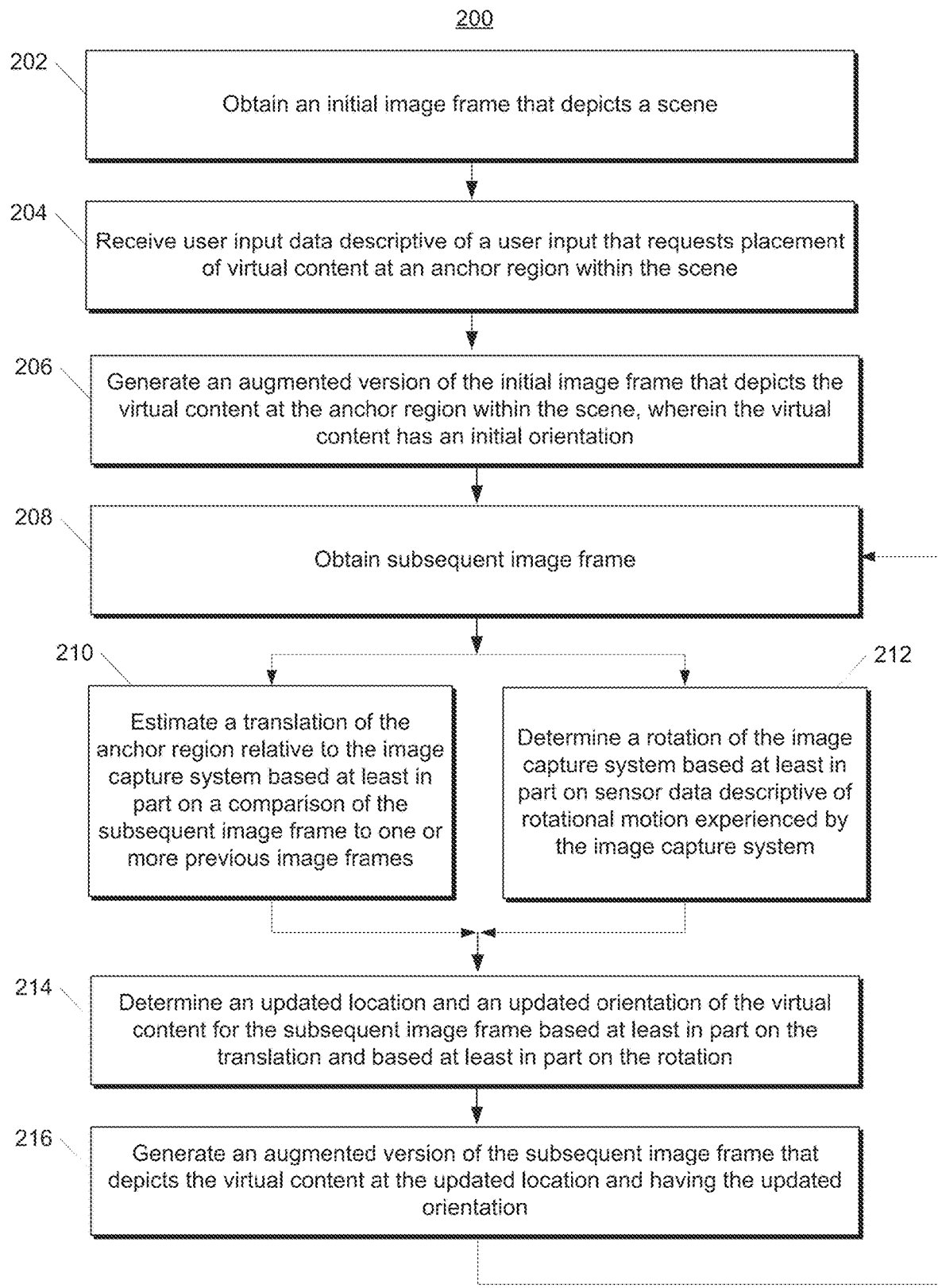
FIG. 2 depicts a flow chart diagram of an example method to generate augmented imagery according to example embodiments of the present disclosure.

FIG. 2 depicts a flow chart diagram of an example method 200 to generate augmented imagery according to example embodiments of the present disclosure. Although FIG. 2 depicts steps performed in a particular order for purposes of illustration and discussion, the methods of the present disclosure are not limited to the particularly illustrated order or arrangement. The various steps of method 200 can be omitted, rearranged, combined, and/or adapted in various ways without deviating from the scope of the present disclosure.

At 202, a computing system can obtain an initial image frame captured by an image capture system and that depicts a scene.

At 204, the computing system can receive user input data descriptive of a user input that requests placement of virtual content at an anchor region within the scene. As one example, the virtual content can include an animated three-dimensional virtual object. As an example, the anchor location can be an anchor surface such as, for example, a horizontal surface.

At 206, the computing system can generate an augmented version of the initial image frame that depicts the virtual content at the anchor region within the scene. The virtual content can have an initial orientation. In some implementations initial orientation can be provided by or based on a rotation vector sensor. Alternatively or additionally, surface normal estimation from images can be performed. In some implementations, initial object depth can be set based on "hit testing" with a horizontal plane with arbitrary distance from the camera.

At 208, the computing system can obtain a subsequent image frame.

At 210, the computing system can estimate a translation of the anchor region relative to the image capture system based at least in part on a comparison of the subsequent image frame to one or more previous image frames. For example, the one or more previous image frames can be an immediately previous image frame.

In some implementations, the method 200 can further include: defining a bounding shape associated with the anchor region; and identifying a respective number of feature points included within the bounding shape in the initial image frame (e.g., a first number of feature points). In some implementations, estimating the translation of the anchor region relative to the image capture system at 210 can include identifying a respective number of feature points in the subsequent image frame; and performing a feature tracking algorithm on at least the feature points extracted from the subsequent image frame and one or more previous image frames (e.g., the previous sequential image frame).

In some implementations, estimating the translation of the anchor region relative to the image capture system at 210 can include identifying a second number of feature points in the subsequent image frame that match feature points from one or more previous image frame(s) (e.g., the previous sequential image frame). In some implementations, when the second number is less than a threshold number, estimating the translation at 210 can include determining the translation of the anchor region based on a global motion of the scene computed from additional background feature points not included in the first number or the second number of feature points. In some implementations, when the second number is greater than the threshold number, estimating the translation at 210 can include determining the translation of the anchor region based on a local motion of the anchor region computed from the second number of feature points and one or more previous anchor region feature points from one or more previous image frames.

At 212, the computing system can determine a rotation of the image capture system based at least in part on sensor data descriptive of rotational motion experienced by the image capture system.

In some implementations, determining the rotation at 212 can include: obtaining sensor data descriptive of a rotation speed of the image capture system; and accumulating rotation speed in quaternion space to determine the rotation of the image capture system.

According to an aspect of the present disclosure, the blocks 210 and 212 can be performed independently of each other. As an example, in some implementations, estimating the translation at 210 can include estimating the translation based solely on the comparison of the subsequent image frame to one or more previous image frames; and/or determining the rotation at 212 can include determining the rotation based solely on the sensor data.

Referring again to FIG. 2, at 214, the computing system can determine an updated location and an updated orientation of the virtual content for the subsequent image frame based at least in part on the translation and based at least in part on the rotation. For example, a model matrix can be used to describe where the virtual content should be located in the subsequent image frame.

In some implementations, estimating the translation of the anchor region relative to the image capture system at 210 can include: determining a two-dimensional translation associated with the anchor region; and determining a scale change associated with the anchor region. In some of such implementations, determining the updated location at 214 can include: applying a pinhole camera model to the two-dimensional translation and the scale change associated with the anchor region to estimate a three-dimensional translation of the image capture system; and determining the updated location of the anchor region based on the three-dimensional translation of the image capture system.

In some implementations, determining the updated location at 214 can include determining the updated location of the virtual content for the subsequent image frame based at least in part on the translation of the anchor region relative to the image capture system plus a scheduled displacement value descriptive of a scheduled displacement of the virtual content from the anchor region. For example, the virtual content can be scheduled to move around the scene relative to the anchor region according to a schedule. For example, a virtual dog can jump up and down and roll over. The scheduled displacement can be two-dimensional displacement or three-dimensional displacement.

At 216, the computing system can generate an augmented version of the subsequent image frame that depicts the virtual content at the updated location and having the updated orientation.

In some implementations, the method 200 can further include displaying the augmented versions of the initial image frame and the one or more subsequent image frames in a viewfinder portion of a user interface associated with the image capture system.

After 216, the method 200 can return to 208 and obtain a subsequent image frame. In some implementations, the method 200 can be performed in real-time concurrent with capture of the one or more subsequent image frames by the image capture system. In other implementations, the method 200 can be performed on a video file that includes the initial image frame and the one or more subsequent image frames previously captured by the image capture system.

In some implementations, the method 200 can further include generating and storing an animated image file that includes the augmented versions of the initial image frame and the one or more subsequent image frames.

Example Augmented Imagery

Figure 5B:
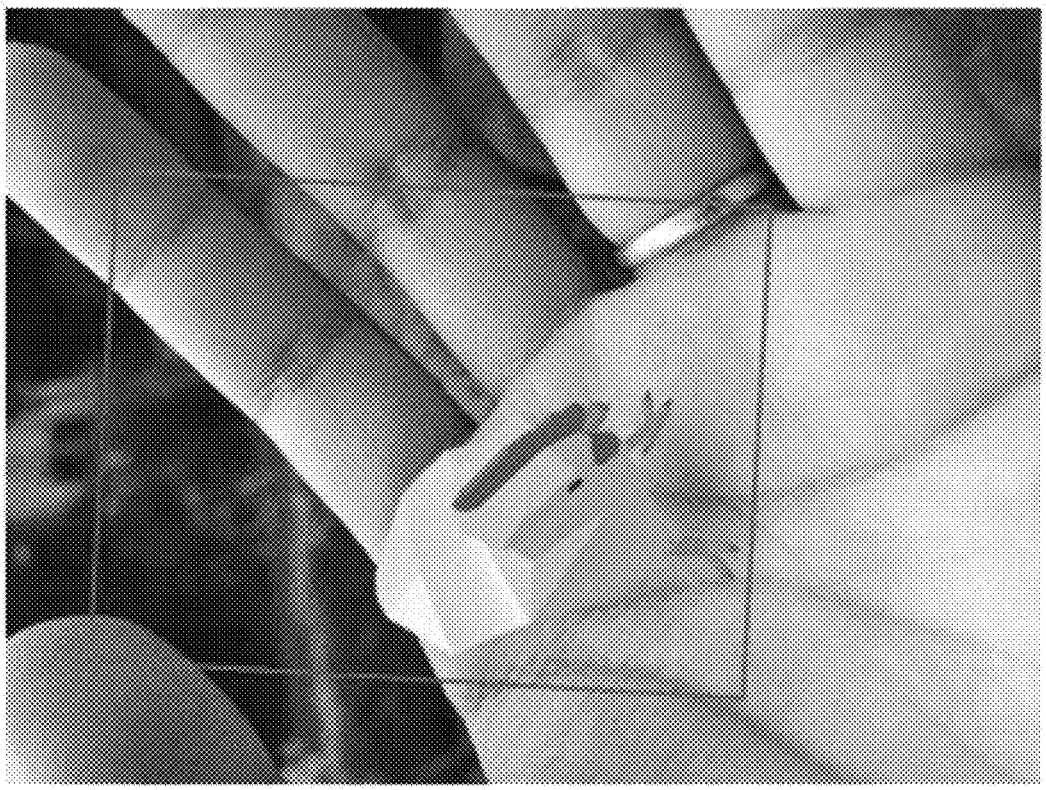
FIGS. 5A and 5B depict graphical diagrams of augmented imagery with motion tracking of an anchor region according to example embodiments of the present disclosure.
Figure 5A:
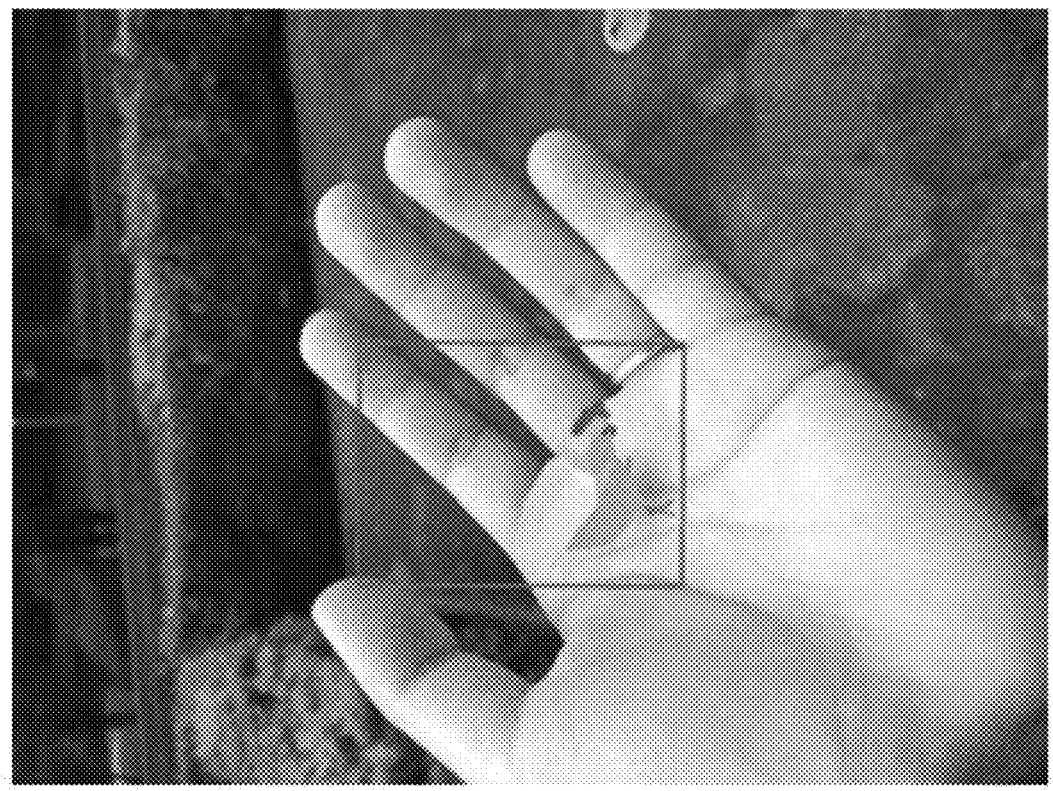

FIGS. 5A and 5B depict graphical diagrams of augmented imagery with motion tracking of an anchor region according to example embodiments of the present disclosure. In particular, FIG. 5A shows an augmented image that has been augmented to depict a virtual chicken that has been placed onto an anchor region. In the depicted image, the anchor region is a palm of a hand. A bounding box is shown around the anchor region. In FIG. 5B, the anchor region (e.g., the palm of the hand) has been moved closer to the camera. As illustrated in FIG. 5B, in response to the movement of the anchor region, the virtual chicken is shown at a larger scale. More particularly, a visual tracking algorithm has been performed on the anchor region (e.g., on feature points extracted from the anchor region to determine that the anchor region has moved closer, as illustrated by the increased size of the bounding box. In response, the virtual chicken is rendered at a larger scale.

Figure 6B:
FIGS. 6A and 6B depict graphical diagrams of augmented imagery according to example embodiments of the present disclosure.
Figure 6A:

FIGS. 6A and 6B depict graphical diagrams of augmented imagery according to example embodiments of the present disclosure. In particular, FIG. 6A, shows an augmented image that has been augmented to depict a virtual chicken that has been placed onto an anchor region. In the depicted image, the anchor region is a bed of straw. In FIG. 6B, the camera has been moved closer and to the right of to the anchor region and also rotated leftwards to look back at the anchor region. In response, the virtual chicken is shown at a larger scale and also has been rotated to account for the change in position of the camera. For example, in FIG. 6A, the left side of the virtual chicken is rendered, while in FIG. 6B, the left, rear side of the chicken is rendered.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
one or more processors;
one or more non-transitory computer readable media that collectively store instructions that, when executed by the one or more processors, cause the computing system to perform operations, the operations comprising:
obtaining an initial image frame captured by an image capture system, wherein the initial image frame depicts a scene;
receiving user input data descriptive of a user input that requests placement of virtual content at an anchor region within the scene;
generating an augmented version of the initial image frame that depicts the virtual content at the anchor region within the scene, wherein the virtual content has an initial size; and
obtaining a subsequent image frame captured by the image capture system;
determining a scale change associated with the anchor region based at least in part on a comparison of the subsequent image frame to one or more previous image frames;
determining an updated scale of the virtual content for the subsequent image frame based at least in part on the scale change associated with the anchor region; and
generating an augmented version of the subsequent image frame that depicts the virtual content with the updated scale.

2. The computing system of claim 1, wherein the scale change is descriptive of the anchor region moving at least one of closer or farther away from the image capture system.

3. The computing system of claim 1, wherein the anchor region comprises a moving surface, wherein the anchor region moves relative to the scene.

4. The computing system of claim 1, wherein the subsequent image frame is descriptive of the anchor region being closer to the image capture system than in the initial image frame.

5. The computing system of claim 1, wherein the virtual content is larger in the augmented version of the subsequent image frame than in the augmented version of the initial image frame in response to the anchor region being larger in the subsequent image frame than in the initial image frame.

6. The computing system of claim 1, wherein the operations further comprise:
determining a rotation of the image capture system based at least in part on sensor data descriptive of rotational motion experienced by the image capture system; and
determining an updated orientation of the virtual content for the subsequent image frame based at least in part on based at least in part on the rotation of the image capture system.

7. The computing system of claim 6, wherein determining the scale change is performed independently of determining the rotation, and wherein determining the rotation is performed independently of determining the scale change.

8. The computing system of claim 1, wherein the operations further comprise:
determining a two-dimensional translation associated with the anchor region; and
determining an updated location of the virtual content for the subsequent image frame based at least in part on the two-dimensional translation.

9. The computing system of claim 8, wherein determining the two-dimensional translation associated with the anchor region based at least in part on a comparison of the subsequent image frame to one or more previous image frames.

10. The computing system of claim 1, wherein the virtual content comprises a three-dimensional virtual object.

11. The computing system of claim 1, wherein determining the updated scale of the virtual content for the subsequent image frame based at least in part on the scale change associated with the anchor region comprises a pinhole camera model.

12. A computer-implemented method, the method comprising:
obtaining, by a computing system comprising one or more processors, an initial image frame captured by an image capture system, wherein the initial image frame depicts a scene;
receiving, by the computing system, user input data descriptive of a user input that requests placement of virtual content at an anchor region within the scene;
generating, by the computing system, an augmented version of the initial image frame that depicts the virtual content at the anchor region within the scene, wherein the virtual content has an initial size; and obtaining, by the computing system, a subsequent image frame captured by the image capture system;

determining, by the computing system, a scale change associated with the anchor region based at least in part on a comparison of the subsequent image frame to one or more previous image frames;

determining, by the computing system, an updated scale of the virtual content for the subsequent image frame based at least in part on the scale change associated with the anchor region; and generating, by the computing system, an augmented version of the subsequent image frame that depicts the virtual content with the updated scale.

13. The method of claim 12, wherein determining the scale change associated with the anchor region based at least in part on a comparison of the subsequent image frame to the one or more previous image frames comprises:

processing the subsequent image frame and the one or more previous image frames with a machine-learned model to generate motion metadata.

14. The method of claim 13, wherein the machine-learned model was trained to classify foreground features in the subsequent image frame and the one or more previous image frames.

15. The method of claim 13, wherein the machine-learned model was trained to identify specific objects in the subsequent image frame and the one or more previous image frames.

16. The method of claim 13, wherein determining the scale change associated with the anchor region based at least in part on a comparison of the subsequent image frame to the one or more previous image frames comprises:

tracking, via the motion metadata, one or more individual objects while discriminating the one or more individual objects from other objects in the subsequent image frame and the one or more previous image frames.

17. One or more non-transitory computer-readable media that collectively store instructions that, when executed by one or more computing devices, cause the one or more computing devices to perform operations, the operations comprising:

obtaining an initial image frame captured by an image capture system, wherein the initial image frame depicts a scene;

receiving user input data descriptive of a user input that requests placement of virtual content at an anchor region within the scene;

generating an augmented version of the initial image frame that depicts the virtual content at the anchor region within the scene, wherein the virtual content has an initial size; and obtaining a subsequent image frame captured by the image capture system;

determining a scale change associated with the anchor region based at least in part on a comparison of the subsequent image frame to one or more previous image frames;

determining an updated scale of the virtual content for the subsequent image frame based at least in part on the scale change associated with the anchor region; and generating an augmented version of the subsequent image frame that depicts the virtual content with the updated scale.

18. The one or more non-transitory computer-readable media of claim 17, wherein the operations further comprise:

providing the augmented version of the subsequent image frame for display in a viewfinder.

19. The one or more non-transitory computer-readable media of claim 17, wherein the operations further comprise:

storing the augmented version of the initial image frame and the augmented version of the subsequent image frame as a video.

20. The one or more non-transitory computer-readable media of claim 17, wherein determining an updated scale of the virtual content for the subsequent image frame comprises:

determining a two-dimensional translation at least in part on the subsequent image frame and the one or more previous image frames; and processing the two-dimensional translation and the scale change with a pinhole camera model to determine a three-dimensional translation.

* * * * *